No. 735,113. Patented August 4, 1903.

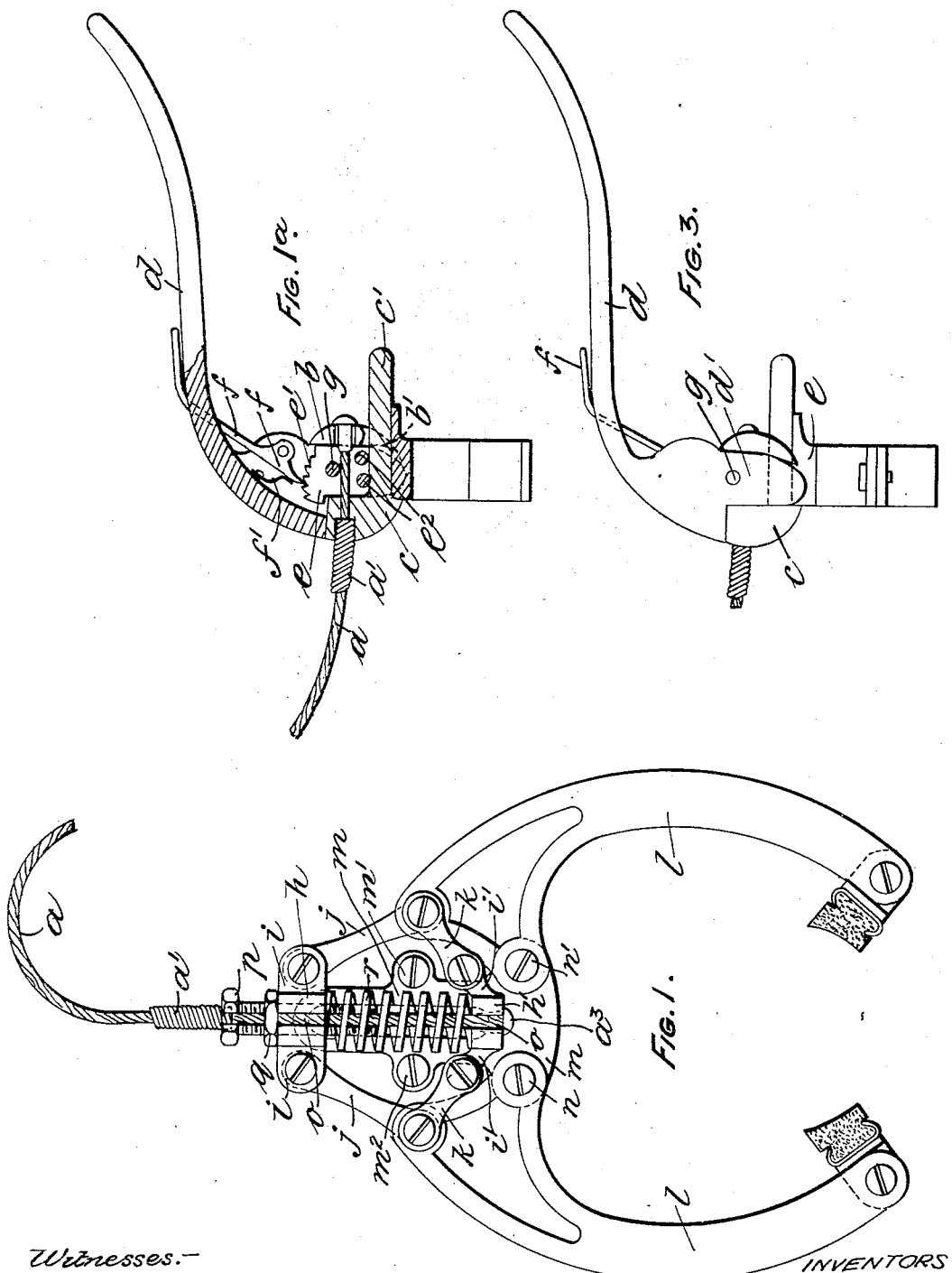

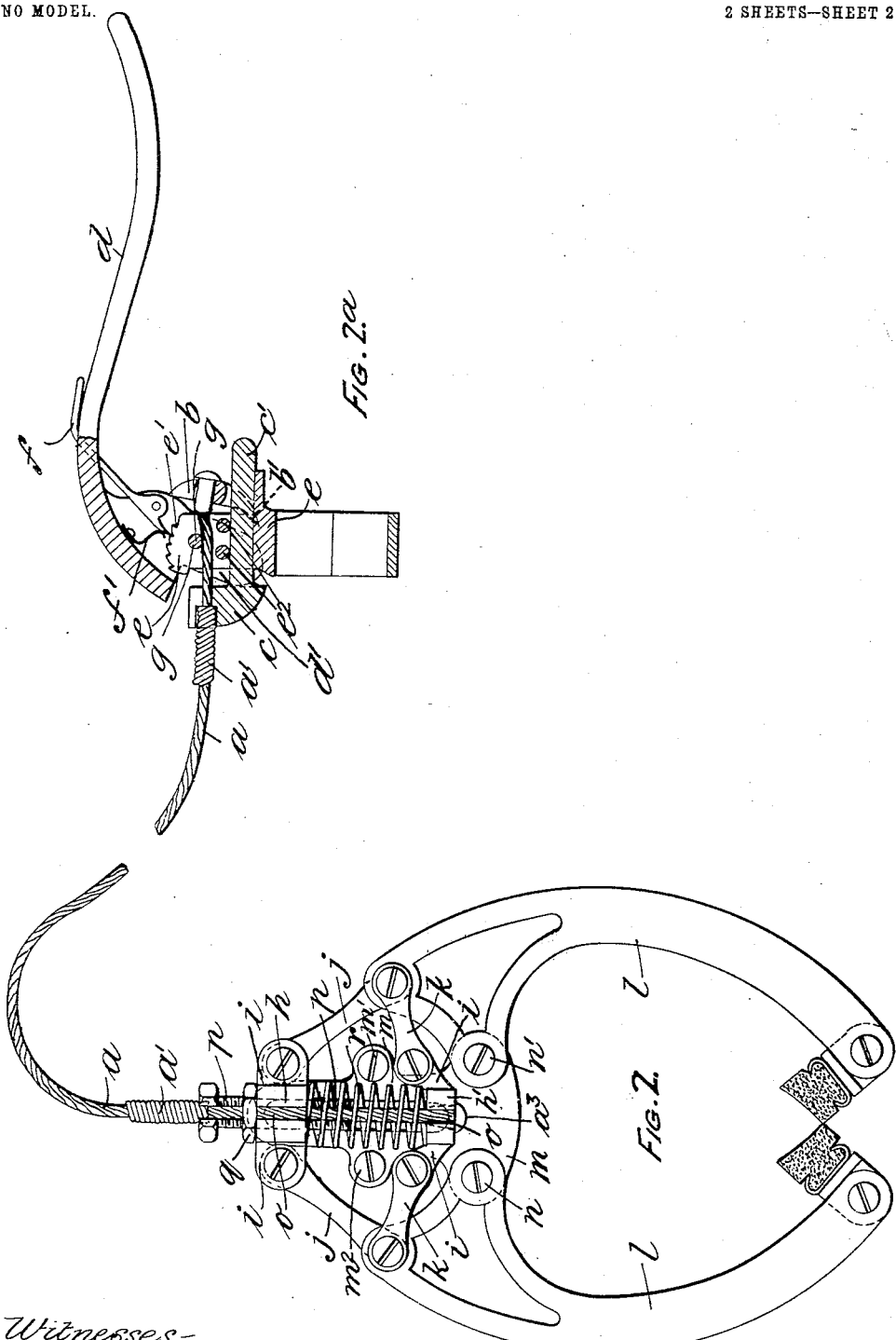

UNITED STATES PATENT OFFICE.

JOHN KELLAND AND HENRY LAWRY, OF PLYMOUTH, ENGLAND.

BRAKE FOR CYCLES OR VEHICLES.

SPECIFICATION forming part of Letters Patent No. 735,113, dated August 4, 1903.

Application filed December 17, 1901. Serial No. 86,280. (No model.)

*To all whom it may concern:*

Be it known that we, JOHN KELLAND, residing at 40 Treville street, and HENRY LAWRY, residing at 101 Old Town street, Plymouth, in the county of Devon, England, citizens of Great Britain, have invented new and useful Improvements in and Relating to Brakes for Cycles or Vehicles and for other Purposes, (for which we have applied for patents in Great Britain, No. 10,371, bearing date May 18, 1901; in France, No. 302,283, bearing date August 23, 1901, and in Germany, bearing date August 22, 1901,) of which the following is a specification.

This invention relates to the "Bowden" type of brake, in which a flexible transmitting member is employed for the connection of the brake-lever mechanism with the operating hand-lever, as described in the specification of the United States Patent No. 609,570, dated August 23, 1898; and the invention has for its object to obviate the necessity of securing any part of the transmitting member to the frame of the machine; to provide a relatively great extent of movement on the operation of the hand-lever or operating part and in such a manner that only a very slight pressure of the hand is required to be exercised; to provide means for locking the operating hand-lever or part in any particular position, according to the braking effect required; to provide means for automatically compensating for any irregularities in the rim of the wheel to which the blocks may be applied, so that no strain may be imposed upon the wheel while the brake is in operation, and generally to provide a brake simple in construction and effective and convenient in operation and particularly applicable for use on cycles and motor-vehicles.

According to the invention the transmitting member between the brake-lever mechanism and the operating hand-lever is provided in two parts which may, as is preferable, be arranged one within the other, the extremities being so connected that on the operation of the hand-lever they shall be separated in opposite directions, thereby effecting a movement in opposite directions of the opposite extremities of the respective parts of the transmitting member which are connected to the brake-lever mechanism.

The invention comprises a pawl-and-ratchet device for retaining the operating hand-lever in its operative position.

The invention also comprises brake-lever mechanism in which the brake levers or blocks are operated by means of toggle-links which are connected to opposing parts to which the respective extremities of the parts of the transmitting member are connected, so that thereby on the separation in opposite directions of the parts of the transmitting member the toggle-links shall act to force the brake-levers into operation. This operation is effected under the compression of a spring which is arranged between the opposite parts to which the toggle-links are connected, and when the operating hand-lever is released the pressure of this spring suffices to positively withdraw the brake-levers from their operative position.

The invention further comprises constructional features which are hereinafter described as applied in a brake constructed according to the invention.

The invention is illustrated in the accompanying drawings, in which—

Figure 1 is an elevation of brake-lever mechanism provided in accordance with the invention. Fig. 1ª is a sectional elevation of the operating hand-lever and operating mechanism. Figs. 2 and 2ª are views corresponding to Figs. 1 and 1ª, in which the respective mechanisms are in their operating positions. Fig. 3 represents in side elevation the operating hand-lever. In Fig. 2 the extent of movement of the brake-levers is slightly exaggerated in order that the operation may the more clearly be apparent.

In carrying the invention into effect according to one design we employ a transmitting member $a\ a'$, provided as in the well-known Bowden brake—that is to say, of two parts $a$ and $a'$, the one, $a$, being a central core, which may conveniently be formed of strands of wire, and the other, $a'$, a tube formed of coiled steel wire, in which the coils are quite contiguous, the parts $a$ being inextensible, while the part $a'$ is incompressible. One extremity of the central core $a$ is fixed within a cam-plate $b$, while the associated extremity of the outer tubular part $a'$ is carried within and abuts against an opposing cam-plate $c$, and between these two cam-plates $b$ and $c$ an operating hand-lever $d$ is pivoted in such a manner that upon being pressed in one direction the opposing cam-plates $b$ and $c$ are separated, as illustrated in Fig. 2$^a$. The operating hand-lever $d$ is mounted so as to pivot on the pin $g$ in a bracket $e$, which is secured to the handle-bar by any suitable convenient means, and this bracket $e$ may be bifurcated, so as to permit the central core $a$ of the transmitting member to pass between, as well as a stem $c'$ for guiding the cam-plate $c$. The stem $c'$ may fit closely within the central recess provided in the bracket $e$ and may be retained in position so as to slide horizontally by such means as pins $e^2$, as illustrated in Figs. 1$^a$ and 2$^a$. Upon the edges $e'$ of the bifurcated bracket $e$ teeth are preferably formed, with which a pawl $f$, mounted within the hand-lever, may engage, so as to hold the lever in any position in which it may be placed, so as thereby to maintain the brake continuously in action without the necessity of continuously holding the hand upon the lever. The pawl may be so arranged that it may be conveniently released by the thumb or forefinger, and means may be provided, such as a spring $f'$, for applying pressure to its forward extremity, by means of which the pawl $f$ may be automatically set in gear with the teeth on the operation of the lever $d$.

It is preferred to so arrange the cam-plate $b$, to which the central core $a$ is secured, that on the operation of the hand-lever $d$ its upper or outer extremity shall be forced outwardly upon its opposite edge $b'$ as a fulcrum. It will be understood that on the depression of the lever $d$ the lateral extensions $d'$ $d'$ cause the separation of the cam-plates $b$ and $c$, as illustrated in Fig. 2$^a$, thereby effecting a corresponding movement of the opposite extremities of the transmitting member $a$ $a'$ to operate the brake-lever mechanism, and that the pawl $f$ until it is released retains the lever $d$ in its operative position. The cam-plate $c$ thus forces backwardly the part $a'$ of the transmission member, while the cam-plate $b$ draws forward the part $a$ thereof.

The opposite extremities of the respective parts of the transmitting member $a$ $a'$ are connected to opposing bosses $h$ $h'$ of the brake-lever mechanism, whose movement toward each other effects the operation of the brake-levers. These opposing bosses $h$ $h'$ are provided with lateral lugs $i$ $i$, by which they are respectively connected to toggle-links $j$ $j$ and $k$ $k$, the opposite extremity of each of the toggle-links on each side being pivotally secured to the extremity of one of the two brake-levers $l$ $l$ employed, and the brake-levers $l$ $l$ in turn are pivotally mounted at $n$ and $n'$ upon a carrying-plate $m$, which is secured, by means of clips behind the plate $m$ at $m'$ $m^2$, to the frame of the machine. The central core $a$ passes through to the lower boss $h'$, which may be provided with a slot $o$, through which the core may be introduced or withdrawn for renewal or repair, and the extremity of the core may conveniently be formed conical, with a protruding head $a^3$, by means of which its extremity may be fixedly retained. The opposing boss $h$ may also be provided with a slot $o$ for the same purpose. A socket $p$ is screwed within the opposing boss, which socket may conveniently be provided with a nut-head. The socket $p$ serves as an abutment for the outer tubular part $a'$ of the transmitting member. It will be understood that a socket $p$ thus provided permits of the adjustment necessary to render the brake perfectly effective, and such a socket or similar means may be provided on the operating part of the brake, as well as on the opposite boss $h'$ of the brake-lever mechanism. A lock-nut $q$ may be provided upon the screwed socket $p$, so that it may be firmly secured in its adjusted position. Similarly the socket $p$ may be provided with a slot as well as the lock-nut, so as to permit of the central core being introduced or removed, as may be required. Between the opposing bosses $h$ and $h'$ a spiral spring $r$ is arranged of sufficient strength to return the brake-levers $l$ $l$ to their disengaged position after the operating-lever $d$ is released.

It will be understood that on the operation of the hand-lever $d$ the cam-plates $b$ and $c$ are separated, and thereby the extremities of the respective parts $a$ and $a'$ of the transmitting member are separated one from the other, and that this movement is communicated to the opposite bosses $h$ $h'$ of the brake-lever mechanism, whereby the brake-levers $l$ $l$ are operated. On the release of the hand-lever $d$ the spring $r$, provided between the opposing bosses $h$ $h'$ of the brake-lever mechanism, effects the return of the brake-levers $l$ $l$ to their normal position.

The invention is not limited to the actual detailed construction hereinbefore specifically described, as modifications may be made, for example, in the manner of mounting the extremities of the respective parts of the transmitting member without departing from the essential features of the invention as hereinbefore specified. It would be possible according to the invention to employ two or more brake-lever mechanisms, for example, on the respective road-wheels of a bicycle with one operating hand-lever, the extremities of the respective parts of the two transmitting members being connected to the same cam-plates.

It will be understood that in the brake hereinbefore described the parts $a$ and $a'$ of the transmitting member are respectively in tension and compression when the brake is operated; but it is obvious that the arrangement might be modified so that the part $a$ would be in compression and the part $a'$ in tension. This would necessitate the connection of the extremities of the respective parts of the transmitting member to the cam-plates of the operating mechanism and to the bosses of the brake-lever mechanism, so that the thrust might be communicated to and applied by the part $a$ and that a pull might be exercised upon and by the part $a'$.

What we claim as our invention, and desire to secure by Letters Patent, is—

1. In a wheel-brake in combination, a transmission member, said transmission member being constituted of two associated elements, an operating device for said brake, movable parts separated by the movement of said operating device, to which parts the adjacent extremities of said elements are respectively connected, and brake mechanism to which the opposite ends of the elements of the said transmitting member are connected, said brake mechanism being operated on the movement of the opposite extremities of said elements to those connected to and movable by the operating device, substantially as described.

2. In a wheel-brake in combination, a transmission member, said transmission member being constituted of two associated elements, an operating device for said brake, movable parts separated by the movement of said operating device, to which parts the adjacent extremities of said elements are respectively connected, and brake mechanism, two movable parts in said brake mechanism to which the opposite and adjacent ends of the elements of the said transmission member are connected, said brake mechanism being operated on the movement of the opposite extremities of said elements connected to the movable parts of said brake mechanism, substantially as described.

3. In a wheel-brake in combination, a flexible transmission member, said transmission member being constituted of two associated elements, an operating device for said brake, movable parts separated by the movement of said operating device, to which parts the adjacent extremities of said elements are respectively connected, and brake mechanism to which the opposite end of the elements of the said transmission member are connected, said brake mechanism being operated on the movement of the opposite extremities of said elements to those connected to and movable by the operating device, substantially as described.

4. In a wheel-brake in combination, a transmission member, said transmission member being constituted of two associated elements, an operating device, cam-plates on said device, said cam-plates being separated by the movement of said operating device, to which cam-plates the adjacent extremities of said elements are respectively connected, and brake mechanism to which the opposite end of the elements of the said transmission member are connected, said brake mechanism being operated on the movement of the opposite extremities of said elements to those connected to and movable by the operating device, substantially as described.

5. In a wheel-brake in combination, a transmission member being constituted of a flexible inextensible core, and a flexible incompressible tube, an operating device, movable parts separated by the movement of said operating device, to which parts the adjacent extremities of the core and tube are respectively connected, and brake mechanism to which the opposite ends of the said core and tube are connected, said brake mechanism being operated on the relative movement of the opposite extremities of the said core and tube to those connected to and movable by the operating device, substantially as described.

6. In a wheel-brake in combination, a transmission member, said transmission member being constituted of two associated elements, an operating device, consisting of an operating hand-lever, a bracket carrying said lever, sliding cam-plates within said bracket, said cam-plates being movable in opposite directions on the operation of the said hand-lever, the elements of the transmission member being respectively connected to the said cam-plates, and brake mechanism to which the opposite ends of the elements of the said transmission member are connected, said brake mechanism being operated on the movement of the opposite extremities of the said elements to those connected to and movable by the operating device, substantially as described.

7. In a wheel-brake in combination, a transmission member, said transmission member being constituted of two associated elements, an operating device for said brake, movable parts separated by the movement of said operating device, to which parts the adjacent extremities of said elements are respectively connected, a pawl-and-ratchet device for maintaining the operating device in fixed position, and brake mechanism to which the opposite end of the elements of the said transmission member are connected, said brake mechanism being operated on the movement of the opposite extremities of said elements to those connected to and movable by the operating device, substantially as described.

8. In a wheel-brake in combination, a transmission member, said transmission member being constituted of two associated elements, an operating device consisting of an operating hand-lever, a bracket carrying said lever, sliding cam-plates within said bracket, said cam-plates being movable in opposite directions on the operation of the said hand-lever, a pawl-and-ratchet device for holding the operating hand-lever in fixed position, the elements of the transmission member being respectively connected to the said cam-plates, and brake mechanism to which the opposite ends of the elements of the said transmission member are connected, said brake mechanism being operated on the movement of the opposite extremities of the said elements to those connected to and movable by the operating device, substantially as described.

9. In a wheel-brake in combination, a transmission member, said transmission member being constituted of two associated elements, an operating device consisting of a hand-lever, a bracket carrying said lever, sliding cam-plates within said bracket, one of said cam-plates having a tail sliding within the other, the said cam-plates being movable in opposite directions on the operation of the said hand-lever, the elements of the transmission member being respectively connected to the said cam-plates, and brake mechanism to which the opposite ends of the elements of the said transmission member are connected, said brake mechanism being operated on the movement of the opposite extremities of the said elements to those connected to and movable by the operating device, substantially as described.

In testimony whereof we have signed our names to this specification in the presence of two-subscribing witnesses.

JOHN KELLAND. [L. S.]
HENRY LAWRY. [L. S.]

Witnesses:
JOHN HUGHES,
JOHN JOLLY STEPHENS.